United States Patent [19]
Hosokawa

[11] Patent Number: 5,803,229
[45] Date of Patent: Sep. 8, 1998

[54] PALLET CHANGER

[75] Inventor: Yutaka Hosokawa, Fuji, Japan

[73] Assignee: Toshiba Kikai Kabushiki Kaisha, Tokyo-To, Japan

[21] Appl. No.: 580,123

[22] Filed: Dec. 28, 1995

[30] Foreign Application Priority Data

Dec. 28, 1994 [JP] Japan .................................. 6-328843

[51] Int. Cl.⁶ ................................................. B65G 37/00
[52] U.S. Cl. ...................................... 198/345.3; 29/33 P
[58] Field of Search .......................... 29/33 P; 198/345.3

[56] References Cited

U.S. PATENT DOCUMENTS

| 4,373,840 | 2/1983 | Miller, Jr. | 198/345.3 |
|---|---|---|---|
| 4,588,067 | 5/1986 | Brems | 198/345.3 |
| 5,189,774 | 3/1993 | Hofmann | 198/345.3 |
| 5,199,158 | 4/1993 | Wioskowski et al. | 198/345.3 |
| 5,259,494 | 11/1993 | Hirose | 198/345.3 |

Primary Examiner—David A. Bucci
Assistant Examiner—Gregory A. Morse
Attorney, Agent, or Firm—Cushman Darby & Cushman IP Group of Pillsbury Madison & Sutro, LLP

[57] ABSTRACT

A pallet changer such that deformation of the pallet at the time of clamping the pallet is suppressed and drawing-in and drawing-out operations of the pallet with respect to the pallet clamping apparatus is eliminated to contribute to high speed pallet exchange is provided. Holding portions 41 projected toward an bore portion 34 opened to the central portion at the lower surface of the pallet 30 are provided. Engagement portions 37 which can be engaged and withdrawn or disengaged with respect to the holding portions 41 are provided at the outer circumferential portion of a disk-shaped clamping member 36 to rotatably and vertically movably supporting the clamping member 36 through a clamping shaft 46, and to connect the clamping member 36 to a driving section 50 for producing a clamping force through the clamping shaft 46.

16 Claims, 6 Drawing Sheets

PALLET CHANGER

BACKGROUND OF THE INVENTION

This invention relates to a pallet changer provided with an apparatus for clamping a pallet onto a table of a machine tool by means of a rotary circular plate type clamping member, and more particularly to a pallet changer so designed that deformation of the pallet while clamping the pallet loaded onto the table of the machine tool can be prevented, and the time for exchanging the old pallet with the pallet to be loaded on the table can be shortened.

DESCRIPTION OF THE PRIOR ART

Machine tools such as machining center, etc. are provided with a pallet changer unit for automatically exchanging workpieces delivered to the table together with the pallets in order to carry out setup efficiently and to improve working efficiency of the machine tool.

Various types pallet changes are known. For example, there is a parallel shuttle type changer and the rotary shuttle type changer.

The parallel shuttle type pallet changer includes a loading unit for linearly transferring pallets waiting in parallel at the front of the table of the machine tool, a pallet loader for conducting carry-out and carry-in operations of pallet with respect to the table, and a clamping unit for allowing a pallet drawn onto the table to place in a position to fix it thereon.

The rotary shuttle type pallet changer comprises a revolving unit for changing positions of plural pallets by revolving action, a pallet loader for carrying pallet from and onto the table, and a clamping unit for fixing the pallet on the table.

In machine tools provided with the pallet changer of this kind, after a pellet exchanging operation has been carried out, the pallet with a workpieces to be processed is mounted to position onto the table of the machine tool to be clamped on the table. Processing is started after that.

FIG. 1 shows an example of a conventional pallet clamping unit used in a pallet changer.

In FIG. 1, the entirety of the pallet clamping unit is indicated by reference numeral 10. In this pallet clamping unit 10, a automatic changer (not shown) is operated so that a pallet 12 is drawn onto a pallet base 14 of the table, the pallet 12 is drawn downwardly against the pallet base 14 by a flat plate 16 exerting a pulling force on the pallet 12.

A T-groove 18 running through the pallet 12 in a transfer direction thereof is formed at the lower surface of the pallet 12. Step portions 20 with which the side edge of the flat plate 16 is engaged are formed along the direction parallel to the T-groove 18.

A hydraulic cylinder (not shown), disposed within the table, generates a clamping force on the pallet 12. The flat plate 16 is connected to the piston rod of the hydraulic cylinder. When the flat plate 16 moves downwardly, this flat plate 16 exerts pulling force on the pallet 12 against the table side by engaging with the step portions 20 through cam followers 22, thus to clamp the pallet 12.

When the pallet 12 is unclamped, the flat plate 16 slightly rises so that it releases from the step portions 22. Accordingly, the pallet 12 is unclamped. When a pallet loader (not shown) is operated so that the pallet 12 is drawn out in the length direction of the T-groove 18, the cam followers 22 rotationally move within the T-groove 18 to allow disengagement from the pallet base of the pallet 12 to be smooth.

In the conventional pallet clamping unit, in order to fix the pallet 12 on the table, T-groove 18 running in a manner to traverse in a length direction from one end to the other end of the pallet 12 is ordinarily utilized. Since rigidity of the pallet 12 is weakened as the result of the direction that the T-groove 18 is run therethrough, i.e., traverse in a length direction, deformation of the pallet 12 takes place when the pallet 12 is caused to be drawn to the table side. When deformation is large, the processing accuracy of the machine tool is diminished.

Moreover, chips and/or coolant scattered during processing of the workpiece are apt to be introduced into the T-groove 18. If chips aren't removed they clog the T-groove 18. This interferes with the drawing-in of the pallet 12.

There is another significant disadvantage to the use of pallets with the a T-groove 18, as previously described. In order to carry the pallet from and onto the table, the pallet loader carries out drawing-in and drawing-out operation of the pallet 12 along the length direction of the T-groove 18 while allowing the flat plate 16 to be fitted into the T-groove 18 at the lower surface of the pallet 12. This necessarily would widen the operation range of the pallet automatic exchange unit, and allow the configuration of the automatic pallet exchange unit to be complicated and large-sized. In addition, the time required for the pallet exchange is prolonged, and improvement in the processing efficiency is prevented.

SUMMARY OF THE INVENTION

An object of this invention is to provide a pallet clamping apparatus which solves the problems with the prior art, and is capable of fixing pallet onto the pallet base in the state of less deformation of pallet.

Another object of this invention is to provide a pallet exchange apparatus which eliminates drawing the pallet onto and from the pallet base to enhance the speed of pallet exchange.

In order to attain the above-mentioned objects, this invention provides a novel pallet clamping apparatus.

Our pallet clamping apparatus includes:

a pallet having a holding portion projected toward the inside at the bore portion opened to the central portion of the bottom surface of the pallet;

a clamping member is provided that has a circular plate form and an engagement portion on the outer circumferential portion thereof, which is adapted to be in proper alignment with the holding portion of the pallet at a predetermined rotational position so that the engagement portion is engaged with the holding portion;

a clamping shaft supports the clamping member rotatably on the horizontal plane and supports the clamping member movable in a vertical direction;

a clamp driving mechanism is connected to the clamping shaft, and applies rotation and upper and lower movement to the clamping shaft and produces a clamping force to draw the clamping member to the pallet base side in the state where the engagement portion and the holding portion are engaged with each other to fix the pallet onto the pallet base.

In preferred embodiment of this invention, the engagement portion comprises a plurality of clamping pawls arranged at the outer circumferential portion of the clamping member so that adjacent pawls form a predetermined angle, and the holding portion of the pallet is composed of shoulders provided in correspondence with the arrangement angle of the clamping pawls at the pallet bore portion, wherein a space for allowing the clamping pawl to be passed therethrough is formed between the adjacent clamped pawls.

The pallet clamping apparatus of this invention includes angular phase matching (adjustment) means such that, in order to carry out matching of the angular phase between the clamping pawl and the shoulder, as the clamping member moves downwardly, there results a rotational position where the clamping pawl can be engaged with the shoulder, while when the clamping member moves upwardly, there results a rotational position where the clamping pawl can be disengaged from the shoulder of the pallet.

Preferably, the angular phase matching means comprises a cam groove formed at the outer circumferential surface of the clamping shaft and adapted for applying rotation to carry out engagement and disengagement of the clamping pawl in a manner followed by vertical movement of the clamping member, and a pin fixed at the pallet base side and adapted to be fitted into the cam groove.

In accordance with this invention, there is employed a configuration such that the clamping member in the circular plate form rotates while carrying out vertical movement to vary the phase relationship between the engagement portion of the clamping member and the holding portion of the pallet inside bore portion so that clamping and unclamping operations of the pallet can be easily achieved. Such an approach is not employed in the conventional clamping unit for clamping the pallet having a T-groove traversing, in a length direction, which causes a weakening of the rigidity of the pallet. In addition, clamping force is uniformly applied to the pallet from the central portion thereof. Accordingly, deformation of the pallet is minimized at the time of clamping the pallet. This also permits the thickness dimension of the pallet to be thinner.

In accordance with this invention, a shaft member interlocking with vertical movement of the clamping shaft, a dog provided at the shaft member, and a sensor for detecting the position of the dog are used, thus to detect clamping and unclamping states of the pallet.

Further, in order to carry out positioning of the pallet, taper corns may be provided on the pallet base upper surface so that the clamping member can be inserted into the inside diameter portion of the pallet, and locate bushes into which the taper cones are respectively fitted may be provided at the back side of the pallet. An air jet nozzle is opened to the locate bush, and a cleaning air conduit for delivering compressed air ejected from the air jet nozzle is provided, thereby making it possible to detect that the pallet has been subjected to positioning onto the pallet base based on the signal from a pressure switch disposed within the cleaning air conduit.

In addition, a pallet changer according to this invention includes:

a revolving shaft;
  a revolving unit supported movably in the vertical direction by the revolving shaft and including an exchange fork for mounting a pallet located at a waiting position and a pallet on a table respectively at the both end portions thereof; and
  the previously described pallet clamping unit of this invention.

Without drawing-in and drawing-out of the pallet on the pallet base as in the prior art, the revolving fork on which pallets to be exchanged are mounted revolves by 180 degrees to carry out exchange between the pallet on the pallet base and the pallet located at the waiting position. As for the pallet on the pallet base, clamping and unclamping can be rapidly carried out by the rotary circular plate type clamping member of the pallet clamping unit. For this reason, loading unit for conducting drawing-in of the pallet onto the pallet base becomes unnecessary, and the time required for exchanging pallets is shortened. This increases efficiency of pallet exchanging.

DETAILED DESCRIPTION OF THE PREFERRED EMBODIMENTS

A preferred embodiment of a pallet changer according to this invention will now be described with reference to the attached drawings.

Figure 1:
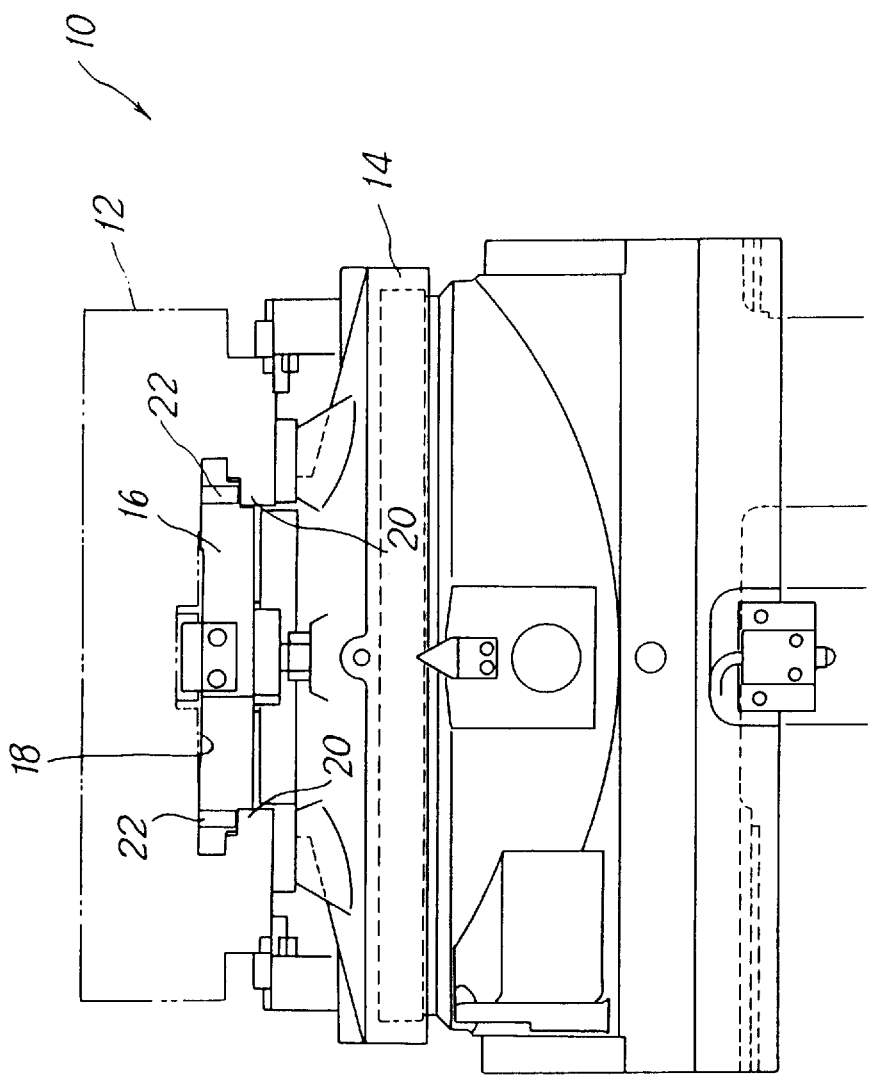
FIG. 1 is a cross sectional view showing the configuration of a conventional pallet clamping apparatus.
Figure 2:
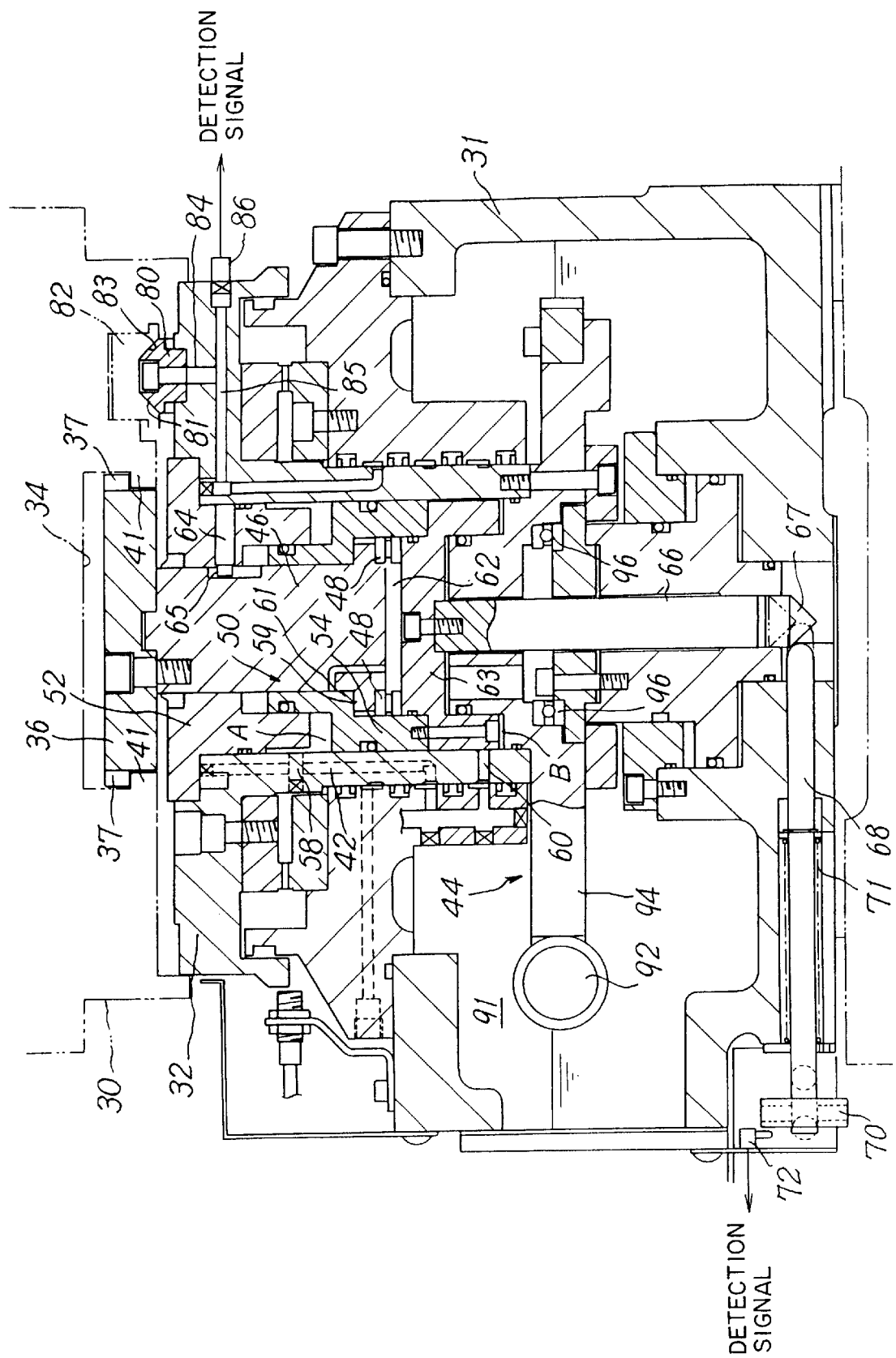
FIG. 2 is a cross sectional view showing an embodiment of a pallet clamping apparatus according to this invention.
Figure 6:
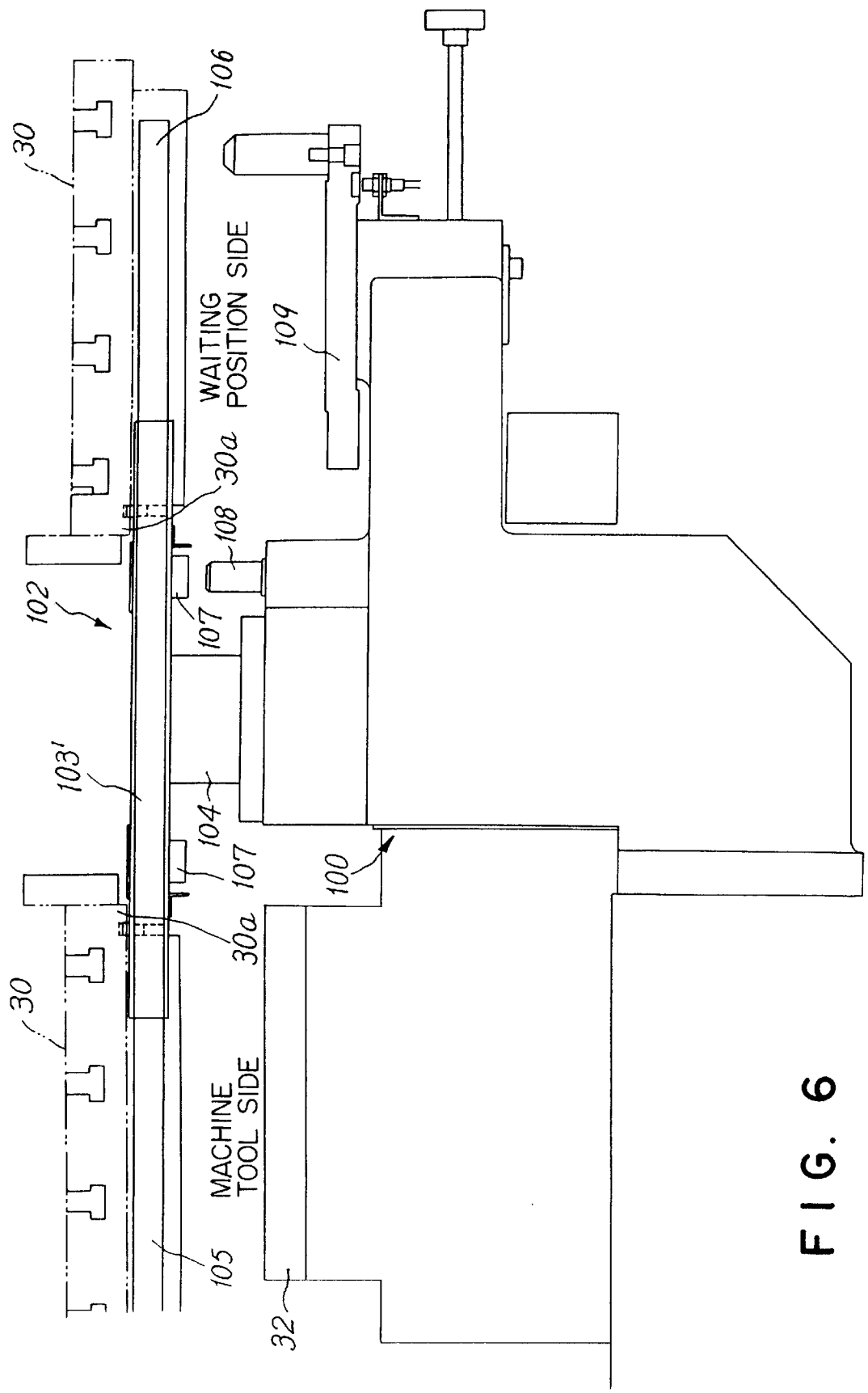
FIG. 6 is a side view showing a pallet automatic changer combined with the pallet clamping unit.

In FIG. 2, reference numeral 30 denotes a pallet indicated by phantom lines. This pallet 30 mounted on an exchange arm 102 of a pallet changer 100 shown in FIG. 6 is transferred while undergoing revolving by 180 degrees between the waiting position and the position immediately above a pallet base 32.

Figure 4:
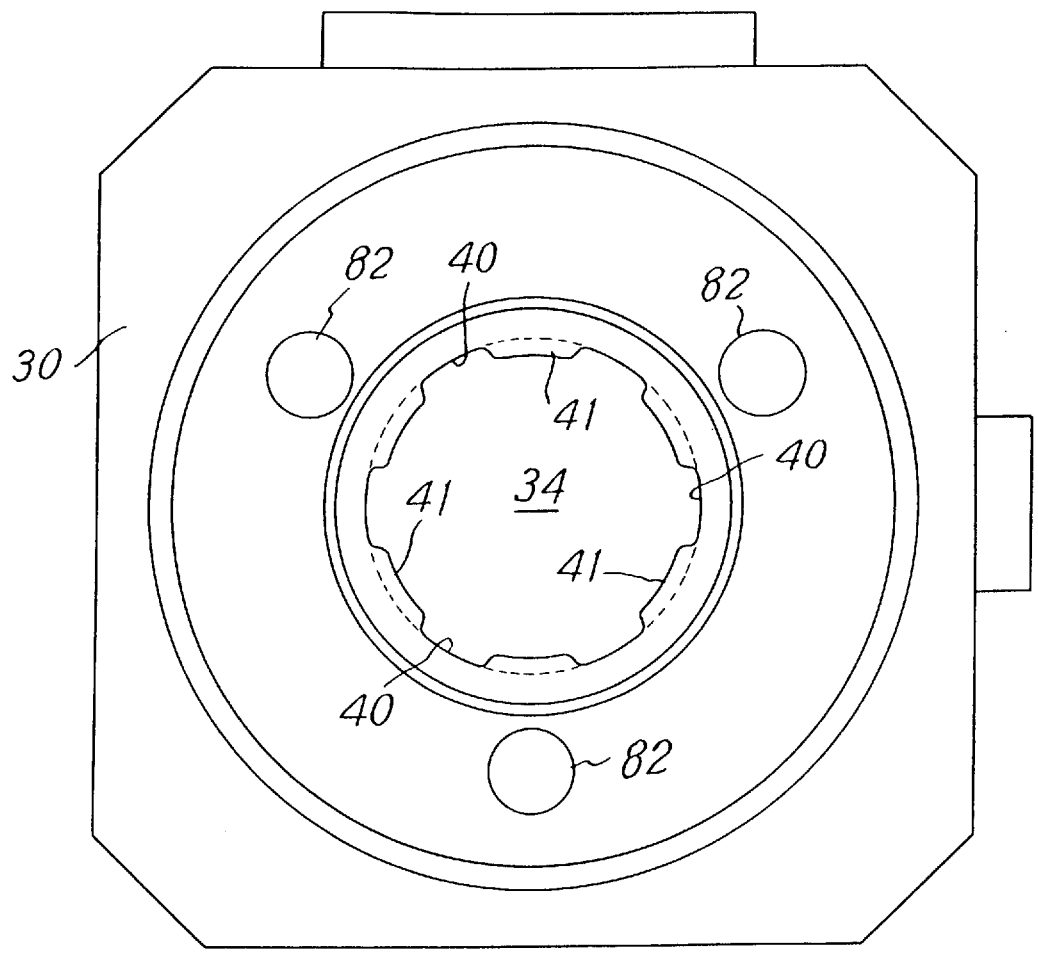
FIG. 4 is a plan view showing the pallet from the back side.

FIG. 4 shows the revolving portions of the pallet changer most clearly.

This pallet clamping apparatus is provided with means such that cut portions 40 and shoulder 41 of a hole portion 34 with step are caused to be in rotational alignment with the clamping pawls 37 of the clamping plate 36 when the pallet 30 is positioned concentric with and immediately above the clamping plate 36. When the clamping plate 36 is raised maintaining the state where the rotational position of the clamping pawls 37 and the cut portions 40 are aligned with each other in angular phase, it is possible to insert the clamping plate 36 into the hole portion 34. Further, when the clamping plate 36 is rotated by 60 degrees so that the clamping pawls 37 and the shoulders 41 are aligned with each other in terms of angular phase, the clamping pawls 37 can be respectively engaged with the shoulders 41. In the state where the clamping plate 36 is fitted into the hole portion 34, space having a height sufficient for stroke of the clamping plate 36 is ensured within the hole portion 34 with step.

At the lower side of such pallet base 32, there is installed a clamp driving mechanism which generates a clamping force for unclamping or clamping the pallet 30 and transmits it to the clamping plate 36. This clamp driving mechanism is disposed within a cylindrical body 42 integral with the pallet base 32 in FIG. 2. It is to be noted that the pallet base 32 is of a structure in which it is connected to a table indexing section 44 so that the entirety thereof can be rotated on the horizontal plane. This table indexing section 44 will be described later.

The clamp driving mechanism will now be described with reference to FIG. 2.

The clamping plate 36 is supported in a horizontal position by a vertical clamping shaft 46, and is rotatably supported on the horizontal plane surface by a thrust bearing 48 at the lower end surface of the clamping shaft 46. This clamping shaft 46 is caused to undergo rotational movement in a vertical direction by angular phase matching means, which will be described later, adapted to be vertically movable and having a function to match or adjust angular phase of the clamping pawls 37 with respect to the cut portions 40 and the shoulders 41 of the pallet 30.

As an actuator for applying upwardly and downwardly movement and clamping force to the clamping shaft 46, a hydraulic cylinder 50 is assembled within the cylindrical body 42 integral with the clamping base 32. Namely, this hydraulic cylinder 50 includes a cylinder cover 52 fitted over the clamping shaft 46, and a piston 54. Pressurized oil is delivered from an oil path 58 to a cylinder chamber A of the rod side; and from an oil path 60 to a cylinder chamber B.

In such clamp driving mechanism using the hydraulic cylinder 50, at the piston 54, a flange portion 59 of the clamping shaft 46 is engaged in such a manner that it is put between a step portion 61 of the piston 54 and the thrust bearing 48. Accordingly, the clamping shaft 46 is supported by the thrust bearing 48 moving in one body with the piston 54. Namely, the clamping shaft 46 is of a structure in such a way that rotation by the angular phase matching means is permitted while it is moving in upper and lower directions. Because of such connecting (joining) structure, the thrust bearing 48 is fixed on the upper surface of the connecting portion 63 in a short circular pillar form of the piston 54, and a gap (clearance) 62 is formed between the lower end surface of the clamping shaft 46 and the connecting portion 63.

Figure 5:
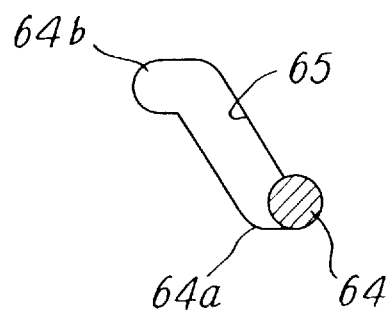
FIG. 5 is an explanatory view showing cam groove provided at clamping shaft.

The angular phase matching means includes a cam groove 65 formed at the outer circumferential surface of the clamping shaft 46, and a pin 64 fixed at the pallet base 32 such that the front end thereof is engaged with the cam groove 65. In this embodiment, the cam groove 65 includes a groove formed so as to be obliquely inclined as shown in FIG. 5, whereby when the head of the pin 64 is slid along the portion between a lower end portion 64a and an upper end portion 65b for a time period of one stroke in correspondence with the stroke of the upper and lower movement of the clamping shaft 46, the clamping shaft 46 is rotated by 60 degrees.

In FIG. 2, a rod 66 is connected from the connecting portion 63 of the piston 54 in a manner to vertically extend downwardly. This rod 66 moves in upper and lower directions interlocking with the operation of the hydraulic cylinder 50. Accordingly, it is possible to detect the clamping and unclamping states of the clamping plate 36 from displacement of the rod 66. In this case, in order to constitute means for detecting clamping or unclamping state, the front end portion of the rod 66 is formed to have the shape of a circular cone, and the front end in a semi-circular form of a dog shaft 68 movably inserted in a horizontal direction is in contact with the circular cone portion 67. The terminating end of the dog shaft 68 is projected toward the outside. A dog 70 is provided at the projected portion. This dog 70 serves to allow position detecting sensor such as limit switch or proximity switch, etc. to be operative. In this case, the dog shaft 68 is of a structure in which it is biased by elastic force of a compressed spring 71 so that the semi-circular front end thereof is kept in contact with the circular cone portion 67 at all times.

On the upper surface of the pallet base 32, there are disposed taper cones 80 for allowing the pallet 30 mounted on the pallet base 32 to be positioned to allow angular adjustment at the time of clamping and unclamping operations to be smooth. Three taper cones 80 are provided at positions symmetrical by 120 degrees with respect to the center of the pallet base 32 as shown in FIG. 3.

Three locate bushes 82 into which these taper cones 80 are respectively fitted are embedded at the bottom surface of the pallet 30 as shown in FIG. 4. At the front end in truncated cone form of the taper cone 80, a taper 81 is provided. In correspondence with the taper 81, a recessed portion 83 having the same taper as above is formed at the locate bush 82. Moreover, an air jet nozzle 84 opened to the top portion thereof is formed at the taper cone 80. Compressed air is delivered from air supply circuit (not shown) through a passage 85 to the air jet nozzle 84. Further, there is provided a pressure switch 86 operative when air delivered to the taper cone 80 becomes equal to a predetermined pressure or more. Thus, it is detected from a detection signal of the pressure switch 86 that the locate bush 82 of the pallet base 32 is on the taper cone 80. After the detection signal is received, switch valve (not shown) provided at air supply circuit is opened. Thus, a control is carried out such that compressed air is blown out from the jet nozzle 84 of the taper cone 80.

Figure 3:
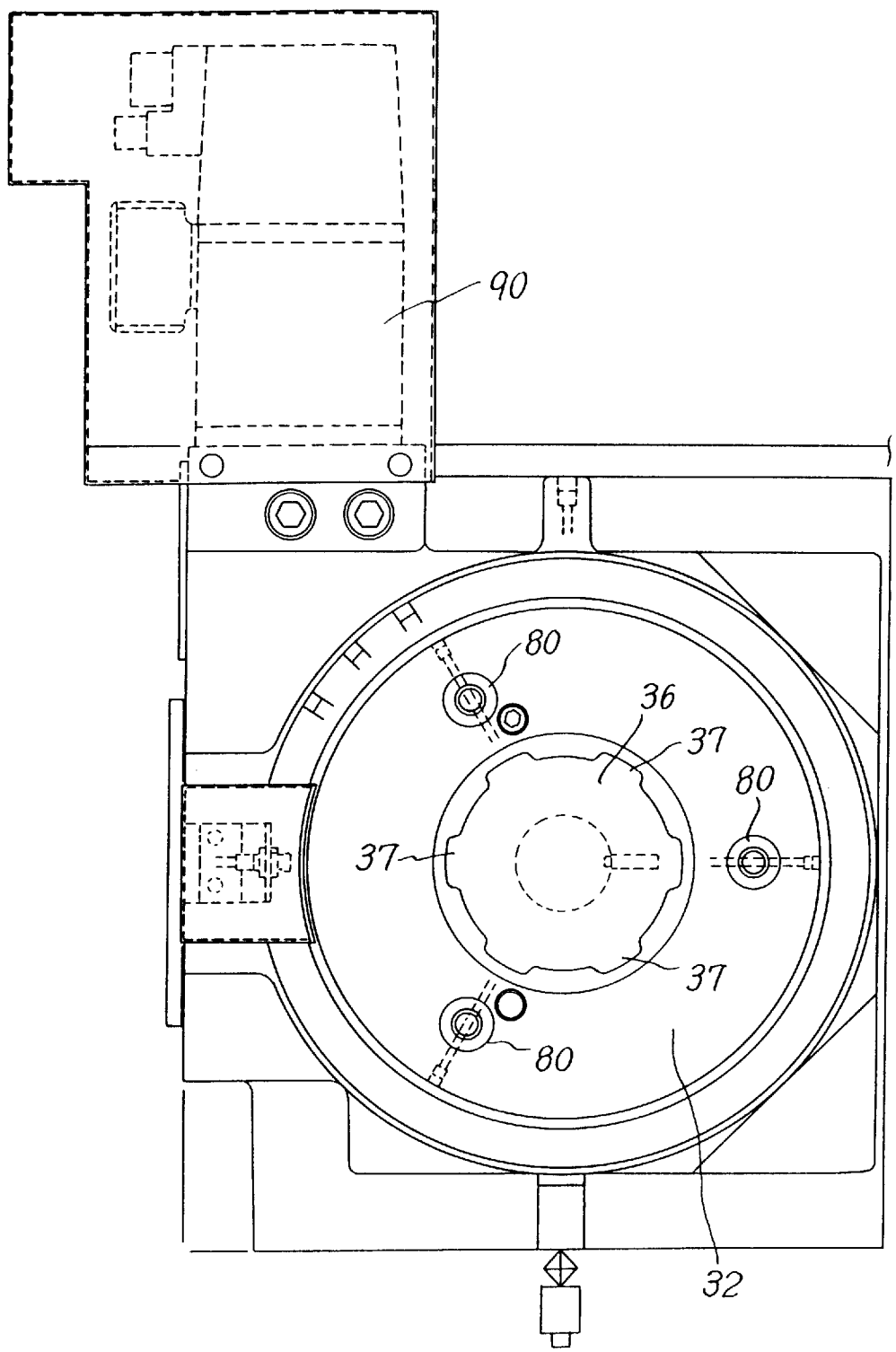
FIG. 3 is a plan view of the pallet clamping apparatus.

In FIG. 3, reference numeral 90 denotes a drive motor of the table indexing mechanism. As shown in FIG. 2, the drive shaft of the drive motor 90 is connected to a worm 92 accommodated within a gear chamber 91 where lubricating oil is filled within the table body 31. A worm gear 94 meshing with the worm 92 is provided at the lower end of the cylindrical portion 42 of the pallet base 32. Moreover, the worm gear 94 is rotatably supported by a thrust bearing 96 at the boss portion thereof from the bottom.

Figure 7:
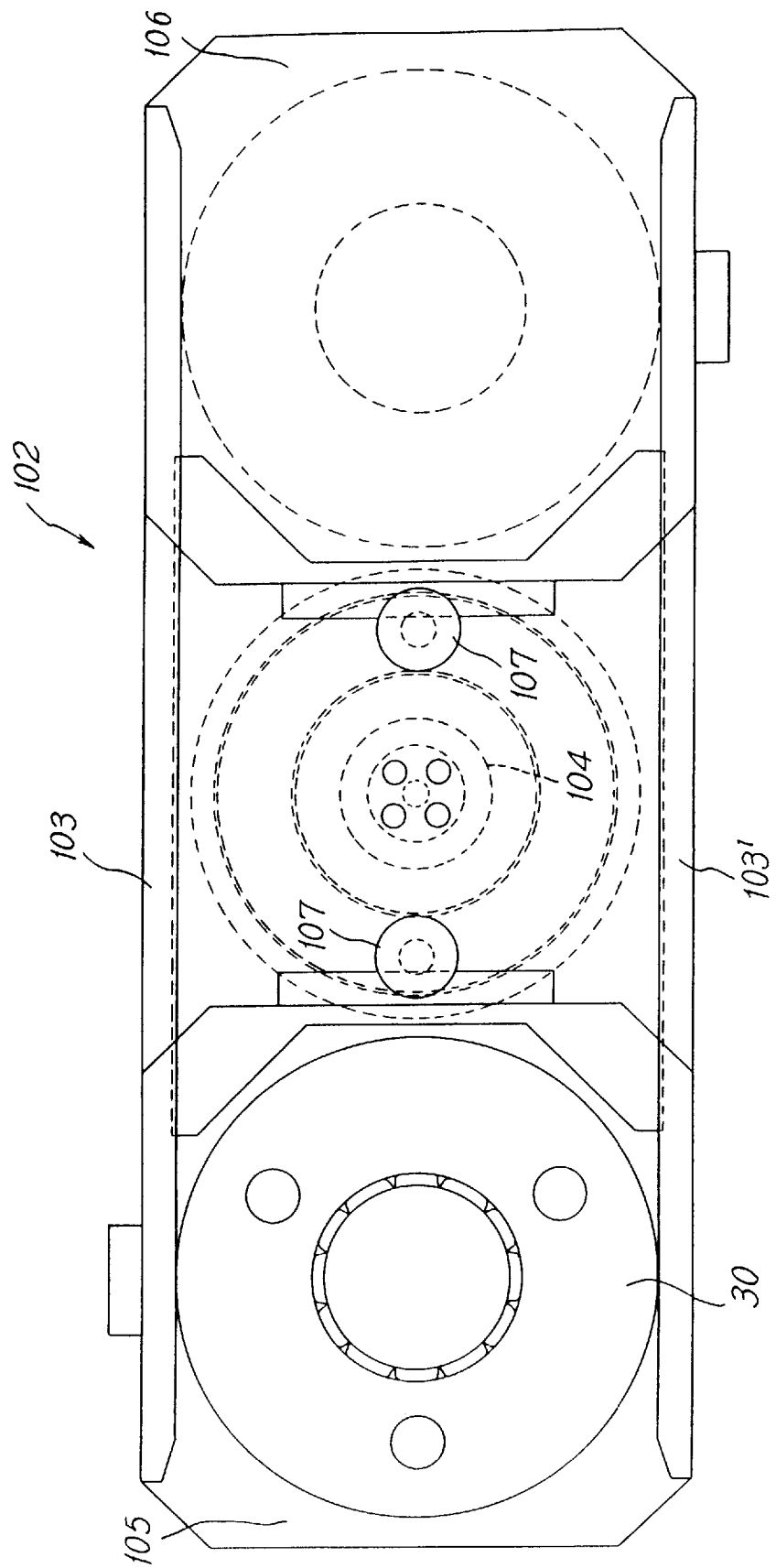
FIG. 7 is a plan view of exchange fork of the pallet automatic changer.

FIG. 6 is a side view showing a pallet automatic changer into which the previously explained pallet clamping unit is assembled, and FIG. 7 is a plan view of exchange fork of the pallet automatic changer.

Reference numeral 100 represents the entirety of the pallet automatic exchange apparatus, and reference numeral 102 represents the entirety of an exchange fork.

This exchange fork 100 serves to respectively support pallets 30 on the both sides of a revolving shaft 104 of the center portion to carry out revolving by 180 degrees to thereby transfer pallets 30, 30 between the position on the pallet base 32 of the machine tool side and the waiting position.

At the both end sides of frame members 103, 103' which form the frame of the exchange fork 102, supporting plates 105, 106 are attached so that pallets 30 are respectively mounted thereon. These supporting plates 105, 106 are formed as such that the pallet 30 is just fitted in correspondence with the form of the pallet 30. The pallet 30 is adapted to sit on the supporting tables 105, 106 by shoulder portion 30a thereof.

As shown in FIG. 6, the exchange fork 102 is connected to the revolving shaft 104 of the pallet automatic changer 100. In this automatic pallet changer 100, the exchange fork 102 is of a structure in which the revolving shaft 104 itself can be vertically moved in addition to the revolving operation. The exchange fork 102 carries out a series of pallet exchange operations such that after the entirety thereof rises up to the height position shown in FIG. 6, the revolving shaft 104 is revolved by 180 degrees, and then goes down. After the exchange fork 102 revolved, a positioning pin 108 attached on the exchange apparatus body side is fitted into positioning sleeves 107 symmetrically provided by 180 degrees with respect to the revolving shaft 104 at the exchange fork 102. Thus, positioning is carried out such that the pallet 30 which has been located on the machine tool side until now is placed at the waiting position on a waiting base 109, and the pallet 30 which has been located at the waiting position is placed on the pallet base of the machine tool side.

The clamping operation followed by pallet exchange will be described below.

In FIG. 2, when a pallet exchange command signal is transmittedd to the pallet automatic exchange apparatus, pressurized oil is introduced into the cylinder chamber B of the hydraulic cylinder 50 in order to unclamp the pallet 30 which has been clamped. As a result, the clamping shaft 46 rises in one body with the piston 54. Since the front end of the pin 64 is fitted into the cam groove 65 at the outer peripheral surface of the clamping shaft 46, the clamping shaft 46 rotates by 60 degrees at the same time when it is rising.

In FIGS. 3 and 4, by the rotation of the clamping shaft 46, the engagement between the clamping pawl 37 of the clamping plate 36 and the shoulders 41 of the pallet 30 is released and the angular phase between the clamping pawls 37 of the clamping plate 36 and the shoulders 41 are shifted by 60 degrees. As a result, the clamping pawl 37 and the cut portion 40 are in correspondence with each other in terms of the angular phase in a manner opposite to the above. Thus, the clamping plate 36 is placed in the state it can be disengaged from the hole 34 with step of the pallet 30.

During the unclamping operation, since the clamping shaft 46 is supported by the thrust bearing 48, it can be smoothly rotated.

The fact that the clamping plate 36 rises so that the pallet 30 has been unclamped can be detected by the position detection sensor because the dog shaft 68 is drawn interlocking with elevation of the clamping shaft 46.

When the pallet 30 has been placed in the unclamped state as described above, the exchange fork 102 shown in FIG. 6 rises as previously described, and the pallet 30 is withdrawn from the pallet base 32. Thereafter, the pallet exchange fork 102 is revolved by 180 degrees. As a result, exchange between new and old pallets 30 is carried out. Thus, the pallet 30 which has been located at the waiting position is transferred onto the pallet base 32. Thereafter, since the pallet exchange fork 102 moves downwardly, the pallet 30 is caused to undergo positioning onto the pallet base 32.

When the pallet 30 falls on the pallet base 32 along with the pallet exchange fork 102, the clamping pawl 37 of the clamping plate 36 and the cut portion 41 at the hole portion 34 are already in correspondence with each other in terms of the angular phase. Even if there is some difference in the angular phase to some extent in the beginning, since positioning is carried out such that respective taper surfaces 81, 83 of the taper cone 80 disposed on the pallet 30 base and locate bush 82 attached on the bottom surface of the pallet 30 are fitted with each other, they are securely in correspondence with each other in terms of the angular phase. Accordingly, the clamping plate 36 is fitted into the hole portion 34 at the bottom surface thereof. Thus, the pallet 30 is set on the pallet base 32.

In the case where the pallet 30 is clamped on the pallet base 32, pressurized oil is delivered to the cylinder chamber A of the rod side of the hydraulic cylinder 50. Thus, the clamping shaft 46 moves downwardly. At this time, the pin 64 engage with the cam groove 65 of the clamping shaft 46 applies rotation by 60 degrees to the clamping plate 36 until it reaches the lower end of the stroke. By rotation followed by such operation, the clamping pawl 37 and the cut portion 40 which have been in same phase with each other until now do not become in correspondence with each other in the angular phase. Correspondence of the angular phase is established such that the clamping pawl 37 is engaged with the clamped pawl 41. As a result, the hydraulic cylinder 50 produces a clamping force to draw the pallet 30 onto the upper surface of the pallet base 32 to firmly fix it thereon.

For a time period until clamping operation of the pallet 30 is completed, the clamping operation is carried out in the state where compressed air is ejected from the air jet nozzle 84 opened to the taper cone 80 on the basis of a detection signal of the pressure switch 86 as stated above. The compressed air blows off chips or coolant respectively attached on the taper surfaces 81, 83 of the taper cones 80 and locate bushes 82. This eliminates the possibility that clogging of chips, etc. takes place, thus to ensure the clamping operation.

In addition, when the clamping plate 36 goes down to clamp the pallet 30, the thrust bearing 48 which supports the clamping shaft 46 falls in one body with the clamping shaft 46 and the piston 54. This means that there is employed a structure such that no clamping force is directly applied to the thrust bearing 48. Accordingly, excessive load is not applied to the thrust bearing 48.

The fact that the pallet 30 has been clamped in this way can be confirmed by receiving an output signal of limit switch sensor for detecting displacement of the dog 70 provided at the dog shaft 68 front end and projected from the table body 31.

What is claimed is:

1. An apparatus for clamping a pallet onto a pallet base on a table of a machine tool, comprising:
   a pallet arranged to have a workpiece mounted on an upper surface thereof and having an holding portion projected toward the inside thereof at a bore portion opened to a central portion of a bottom surface thereof,
   a clamping member having a circular plate form and having an engagement portion on the outer circumferential portion thereof, which is adapted to be in phase angle relative to the holding portion of the pallet at a predetermined rotational position so as to be engaged with the holding portion;
   a clamping shaft for supporting the clamping member rotatably on a horizontal plane and for supporting the clamping member movably in a vertical direction; and
   a clamp driving mechanism connected to the clamping shaft, and adapted for applying rotation and upper and lower movement to the clamping shaft and for producing a clamping force to draw the clamping member onto the pallet base when the engagement portion and the holding portion are engaged with each other to fix the pallet on the pallet base.

2. An apparatus according to claim 1, wherein the engagement portion of the clamping member comprises a plurality of clamping pawls arranged at the outer circumferential portion of the clamping member so that adjacent clamping pawls form a predetermined center angle,
   the holding portion comprises shoulders provided in correspondence with the arrangement angle of the clamping pawls at the bore portion of the pallet, said shoulders forming spaces permitting the clamping pawl to be passed therethrough between adjacent shoulders.

3. An apparatus according to claim 2, further comprising:
   angular phase matching arrangement configured such that, in order to allow the clamping pawls and the shoulders to be in correspondence with each other in terms of the angular phase, the clamping member is caused to be at a rotational position where the clamping pawls thereof can be engaged with the shoulders at a position of the lower end of the stroke of the clamping member, and that the engagement state between the clamping pawls of the clamping member and the shoulders is released at a position of the upper end of the stroke of the clamping member to allow the clamping member to be at a rotational position where it can be disengaged and withdrawn from the bore portion of the pallet.

4. An apparatus according to claim 3, wherein the angular phase matching arrangement comprises:

a cam groove formed at the outer circumferential surface of the clamping shaft, a pin fixed at the pallet base side, being engaged with the cam groove, and said cam groove cooperates with said pin for applying rotational movement between engagement and disengagement positions of the clamping pawl to the clamping shaft in a manner followed by vertical movement thereof.

5. An apparatus according to claim 1, further comprising:

a pallet positioning arrangement for allowing the pallet to be positioned so as to be located at a position where the clamping member can be inserted into the bore portion of the pallet, and position detecting means for detecting that the pallet has been positioned onto the pallet base.

6. An apparatus according to claim 5, wherein the pallet positioning arrangement comprises;

a plurality of taper cones disposed on the upper surface of the pallet base; and locating bushes disposed on the bottom surface of the pallet and adapted so that the taper cones are respectively fitted thereinto.

7. An apparatus according to claim 5, wherein the position detecting means comprises:

a cleaning air conduit for delivering compressed air ejected from an air jet nozzle opened at the locating bushes; and a pressure switch for outputting a detection signal when pressure within the cleaning air conduit becomes substantially equal to a predetermined value.

8. An apparatus according to claim 1, further comprising:

a thrust bearing rotatable supporting the clamping shaft at the lower end thereof, the clamping shaft being directly connected to a hydraulic cylinder of the clamp driving mechanism through the thrust bearing.

9. An apparatus according to claim 1, further comprising detecting means for detecting clamping and unclamping state of the pallet, wherein the detecting means includes:

a shaft member having a dog, which is advanced and withdrawn interlocking with upper and lower movement of the clamping shaft, and a sensor for detecting the position of the dog.

10. A pallet changer adapted for carrying out exchange between a pallet located at a waiting position on which an unprocessed workpiece is mounted and a pallet located on a table of a machine tool, comprising:

a revolving shaft revolvable by 180 degrees;

a revolving unit supported movably in the vertical direction by the revolving shaft, and including an exchange fork for mounting a pallet located at the waiting position and a pallet located on the table respectively at the both end portions thereof; and a pallet clamping unit for fixing the pallet onto the table after exchange of pallet said pallet clamping unit comprising:

a pallet adapted so that a work is mounted on the upper surface thereof and having an holding portion projected toward the inside at the bore portion opened to the central portion of the bottom surface thereof, a clamping member in a circular plate form having an engagement portion on the outer circumferential portion thereof, which is adapted to be in phase angle relative to the holding portion of the pallet at a predetermined rotational position so as to be engaged with the holding portion, a clamping shaft for supporting the clamping member rotatably on a horizontal and for supporting the clamping member movably in a vertical direction; and a clamp driving mechanism connected to the clamping shaft, and adapted for applying rotation and upper and lower movement to the clamping shaft and for producing a clamping force to draw the clamping member to the pallet base in the state where the engagement portion and the holding portion are engaged with each other to fix the pallet on the pallet base.

11. An apparatus according to claim 10, wherein the engagement portion of the pallet comprises a plurality of clamping pawls arranged at the outer circumferential portion of the clamping member so that adjacent ones of the clamping pawls form a predetermined center angle; and the holding portion has shoulders provided at the bore portion of the pallet in correspondence with the arrangement center angle of the clamping pawls, said shoulders form space permitting the clamping pawl to be passed therethrough between adjacent ones of the clamped pawls.

12. An apparatus according to claim 11, further comprising:

angular phase matching structure arranged such that, in order to allow the clamping pawl and the shoulder to be in correspondence with each other in terms of the angular phase, at a position of the lower end of the stroke of the clamping member, the clamping member is caused to be at a rotational position where the clamping pawl thereof can be engaged with the shoulder, and that, at a position of the upper end of the stroke of the clamping member, the engagement state between the clamping pawl of the clamping member and the shoulder is released to allow the clamping member to be at a rotational position where it can be disengaged and withdrawn from the bore portion of the pallet.

13. An apparatus according to claim 12, wherein the angular phase matching structure includes:

a cam groove formed at the outer circumferential surface of the clamping shaft, and a pin fixed at the pallet base side, being engaged with the cam groove, and said cam groove cooperates with said pin for applying rotational movement between engagement and disengagement positions of the clamping pawl to the clamping shaft in a manner followed by vertical movement thereof.

14. An apparatus according to claim 10, further comprising:
a pallet positioning arrangement for allowing the pallet to be positioned so as to be located at the position where the clamping member can be inserted into the bore portion of the pallet; and
position detecting means for detecting that the pallet has been positioned onto the pallet base.

15. An apparatus according to claim 14,
wherein the pallet positioning means comprise:
a plurality of taper cones disposed on the upper surface of the pallet base; and
locating bushes disposed at the bottom surface of the pallet and adapted so that the taper cones are respectively fitted thereinto.

16. An apparatus according to claim 14, wherein the position detecting means comprises:
an air jet nozzle opened to the locating bushes;
a cleaning air conduit for supplying compressed air ejected from the air jet nozzle; and
a pressure switch for outputting a detection signal when pressure within the cleaning air conduit becomes substantially equal to a predetermined value.

* * * * *